(12) United States Patent
Fabrizio

(10) Patent No.: US 10,907,860 B2
(45) Date of Patent: Feb. 2, 2021

(54) ELECTRIC TANKLESS WATER HEATER

(71) Applicant: Chronomite Laboratories, Inc., City of Industry, CA (US)

(72) Inventor: Edward V. Fabrizio, Rancho Cucamonga, CA (US)

(73) Assignee: Chronomite Laboratories, Inc., City of Industry, CA (US)

( * ) Notice: Subject to any disclaimer, the term of this patent is extended or adjusted under 35 U.S.C. 154(b) by 193 days.

(21) Appl. No.: 16/149,936

(22) Filed: Oct. 2, 2018

(65) Prior Publication Data

US 2020/0103143 A1   Apr. 2, 2020

(51) Int. Cl.
| | | |
|---|---|---|
| *F24H 9/20* | (2006.01) | |
| *F24H 1/10* | (2006.01) | |
| *F16K 31/00* | (2006.01) | |
| *F16K 11/044* | (2006.01) | |

(52) U.S. Cl.
CPC ........... *F24H 9/2028* (2013.01); *F24H 1/102* (2013.01); *F16K 11/044* (2013.01); *F16K 31/002* (2013.01)

(58) Field of Classification Search
CPC ........ F24H 9/2028; F24H 1/102; F24H 1/142; F24H 1/103; F24H 1/0018; F24H 1/08; F16K 31/002; F16K 11/044; G05D 23/00
See application file for complete search history.

(56) References Cited

U.S. PATENT DOCUMENTS

| | | | |
|---|---|---|---|
| 4,762,980 A | 8/1988 | Insley | |
| 4,960,976 A | 10/1990 | Insley | |
| 6,909,843 B1 | 6/2005 | Fabrizio | |
| 7,567,751 B2 | 7/2009 | Fabrizio | |
| 7,779,790 B2 | 8/2010 | Fabrizio | |
| 8,064,758 B2 | 11/2011 | Fabrizio | |
| 8,104,434 B2 | 1/2012 | Fabrizio | |
| 8,280,236 B2 | 10/2012 | Fabrizio | |
| 8,577,211 B2 | 11/2013 | Lucker et al. | |
| 9,140,466 B2 | 9/2015 | Jurczyszak et al. | |
| 9,234,674 B2 | 1/2016 | Hayden et al. | |
| 9,410,720 B2 | 8/2016 | Jurczyszak et al. | |
| 9,702,585 B2 | 7/2017 | Hayden et al. | |
| 2005/0185942 A1 | 8/2005 | Fabrizio | |
| 2009/0285569 A1 | 11/2009 | Fabrizio | |
| 2010/0278519 A1 | 11/2010 | Fabrizio | |
| 2011/0013893 A1 | 1/2011 | Fabrizio | |

(Continued)

OTHER PUBLICATIONS

Eemax, Inc., "Installation Guide and Owner's Manual 'Accumix MT/MB'—Electric Instantaneous Water Heater with ASSE 1070 Approved Mixing Valve," publication date unknown, pp. 1-12, downloaded on Oct. 2, 2018 from http://www.eemax.com/pdata/manuals/Accumix%20Manual%20EX07200-75%20Rev%20A.pdf.

*Primary Examiner* — Shawntina T Fuqua
(74) *Attorney, Agent, or Firm* — Eric J. Sosenko; Jonathan P. O'Brien; Honigman LLP

(57) ABSTRACT

A tankless water heater system including a tankless water heater assembly and a mixing valve assembly enclosed within a system housing. The mixing valve assembly is formed by a one piece mixing valve housing that defines an unheated water path proceeding to the heater assembly and a heated water path proceeding from a hot water inlet passageway to a mixed water outlet passageway. Water flow through the mixed water passageway is controlled by mixing valve that includes a shuttle operably coupled to a thermostatic motor.

22 Claims, 3 Drawing Sheets

(56) References Cited

U.S. PATENT DOCUMENTS

| | | |
|---|---|---|
| 2014/0023352 A1 | 1/2014 | Jurczyszak et al. |
| 2014/0023354 A1 | 1/2014 | Hankins et al. |
| 2014/0178057 A1 | 6/2014 | Hayden et al. |
| 2015/0345830 A1 | 12/2015 | Jurczyszak et al. |
| 2016/0097562 A1 | 4/2016 | Hayden et al. |
| 2016/0178234 A1 | 6/2016 | Hayden et al. |
| 2016/0245546 A1 | 8/2016 | Mihu et al. |
| 2017/0268800 A1 | 9/2017 | Hayden et al. |
| 2018/0306463 A1* | 10/2018 | Yuan ................ F24H 1/105 |

* cited by examiner

ELECTRIC TANKLESS WATER HEATER

BACKGROUND

1. Field of the Invention

The present invention generally relates to electric tankless water heaters. More specifically, the present invention relates to electric tankless water heating systems providing an output of water at a constant temperature.

2. Description of Related Technology

Tankless water heaters are used to increase the temperature of water supplied from a water source. Such water heaters often include an inlet, an outlet, a conduit for transporting the water from the inlet to the outlet, and one or more heater elements for increasing the temperature of the water prior to the water exiting the outlet.

In order to achieve a desired temperature of water exiting the outlet of the tankless water heater, it is necessary to control the electrical energy supplied to heater elements. The heating element(s) must be of sufficient wattage to maintain the desired outlet water temperature at the maximum flow rate of the tankless water heater. If less than the maximum water temperature is desired, less electrical energy is provided to the heater elements resulting in lower temperature water exiting the heater. However, this temperature change is not immediate. Additionally, depending on the rate of flow of the water, the temperature of the outputted water may vary. A decrease in the flow rate of the water will result in an increase in the water temperature, unless the electrical energy provided to the water heater is correspondingly reduced. Similarly, an increase in the flow rate of the water will result in a decrease in the water temperature, unless the electrical energy provided to the water heater is correspondingly increased.

If a set water temperature from the tankless water heater is desired, then the flow rate of water through the water heater and electrical power provided to the water heater must be monitored and adjusted. This requires increasingly complex control systems and, accordingly, increasingly expensive systems.

While existing electric tankless water heaters have proven acceptable for their intended purpose, a continuous need for improvement remains in the relevant art.

SUMMARY

In satisfying the above need, as well as overcoming the enumerated drawbacks and other limitations of the related art, the present disclosure provides an electric tankless water heating system with an integrated mixing valve assembly.

In one aspect, the invention is encompassed in a tankless water heating system having a tankless water heater assembly, a mixing valve assembly and a system housing. The heater assembly includes a heater housing having a cold water inlet, a hot water outlet and a heating chamber therebetween. At least one heating element is located in the heating chamber, and a controller is coupled to the heating element and to a temperature sensor located in a flow through the heater housing. The controller regulates the amount of electrical current flowing through the heating element in response to a flow condition measured by the flow and temperature sensors. The mixing valve assembly includes a one piece mixing valve housing mounted to the heater housing. The mixing valve housing defines an unheated water path proceeding from a cold water inlet passageway to a cold water outlet passageway and the cold water outlet passageway is directly coupled to the cold water inlet of the heater housing. The mixing valve housing also defining a heated water path proceeding from a hot water inlet passageway to a mixed water passageway, wherein the hot water inlet passageway is directly coupled to the hot water outlet of the heater housing. The flow of water through the mixed water passageway is controlled by mixing valve, which includes a shuttle operably coupled to a thermostatic motor located in a valve chamber defined in the mixing valve housing. The valve chamber is in fluid communication with the cold water inlet passageway, the cold water outlet passageway, the hot water inlet passageway and the mixed water outlet passageway. The shuttle is axially moveable by the thermostatic motor to selectively open and close cold and hot water ports into a mixing chamber defined at least in part by the shuttle and within which part of the thermostatic motor is provided. The mixing chamber is fluidly coupled to the mixed water outlet passageway. The assembly housing of the system encloses both the heater assembly and the mixing valve assembly.

In another aspect, the heater housing and the mixing valve housing include mounting flanges in mating engagement with one another.

In a further aspect, the mounting flanges are secured together by at least one fastener.

In an additional aspect, the cold water passageway terminates at or adjacent to the mounting flange of the mixing valve housing.

In yet another aspect, the hot water passageway originates at or adjacent to the mounting flange of the mixing valve housing.

In still a further aspect, the mounting flange of the mixing valve housing defines a channel coupled to the hot water passageway.

In another aspect, the channel forms a terminal portion of the hot water passageway.

In yet a further aspect, the channel is transverse to the hot water passageway.

In an additional aspect, the channel extends along the mounting face.

In still another aspect, the channel is open in the direction of the heater housing.

In a further aspect, the unheated water path flows around the mixing valve.

In an additional aspect, the unheated water path is partially defined by the mixing valve.

In still a further aspect, wherein the unheated water path is partially defined by an annulus formed in a portion the mixing valve.

In another aspect of the invention, a mixing valve assembly is provided and includes a one piece mixing valve housing that defines an unheated water path proceeding from a cold water inlet passageway to a cold water outlet passageway, and a heated water path proceeding from a hot water inlet passageway to a mixed water outlet passageway. Flow of water through the mixed water passageway is controlled by mixing valve, which includes a shuttle operably coupled to a thermostatic motor located in a valve chamber defined in the mixing valve housing. The valve chamber is in fluid communication with the cold water inlet passageway, the cold water outlet passageway, the hot water inlet passageway and the mixed water outlet passageway. The shuttle is axially moveable by the thermostatic motor to selectively open and close a cold water port and a hot water port into a mixing chamber that is defined, at least in part, by the shuttle and in which at least part of the thermostatic motor is provided. The mixing chamber is fluidly coupled to the mixed water outlet passageway.

In another aspect, the valve housing includes a mounting flange and the cold water passageway terminates at or adjacent to the mounting flange.

In a further aspect, the hot water inlet passageway originates at or adjacent to the mounting flange.

In an additional aspect, the mounting flange of the mixing valve housing defines a channel coupled to the hot water passageway In yet another aspect, the channel is open on one side.

In still a further aspect, the channel is transverse to the hot water inlet passageway.

In an additional aspect, the unheated water path flows around the mixing valve.

In still another aspect, the unheated water path is partially defined by the mixing valve.

In yet a further aspect the unheated water path is partially defined by an annulus formed in a portion the mixing valve Further objects, features and advantages will become readily apparent to persons skilled in the art after review of the following description with reference to the drawings and the claims that are appended to inform a part of this specification.

BRIEF DESCRIPTION OF THE DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

An illustrative embodiment incorporating the principles of the present invention will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
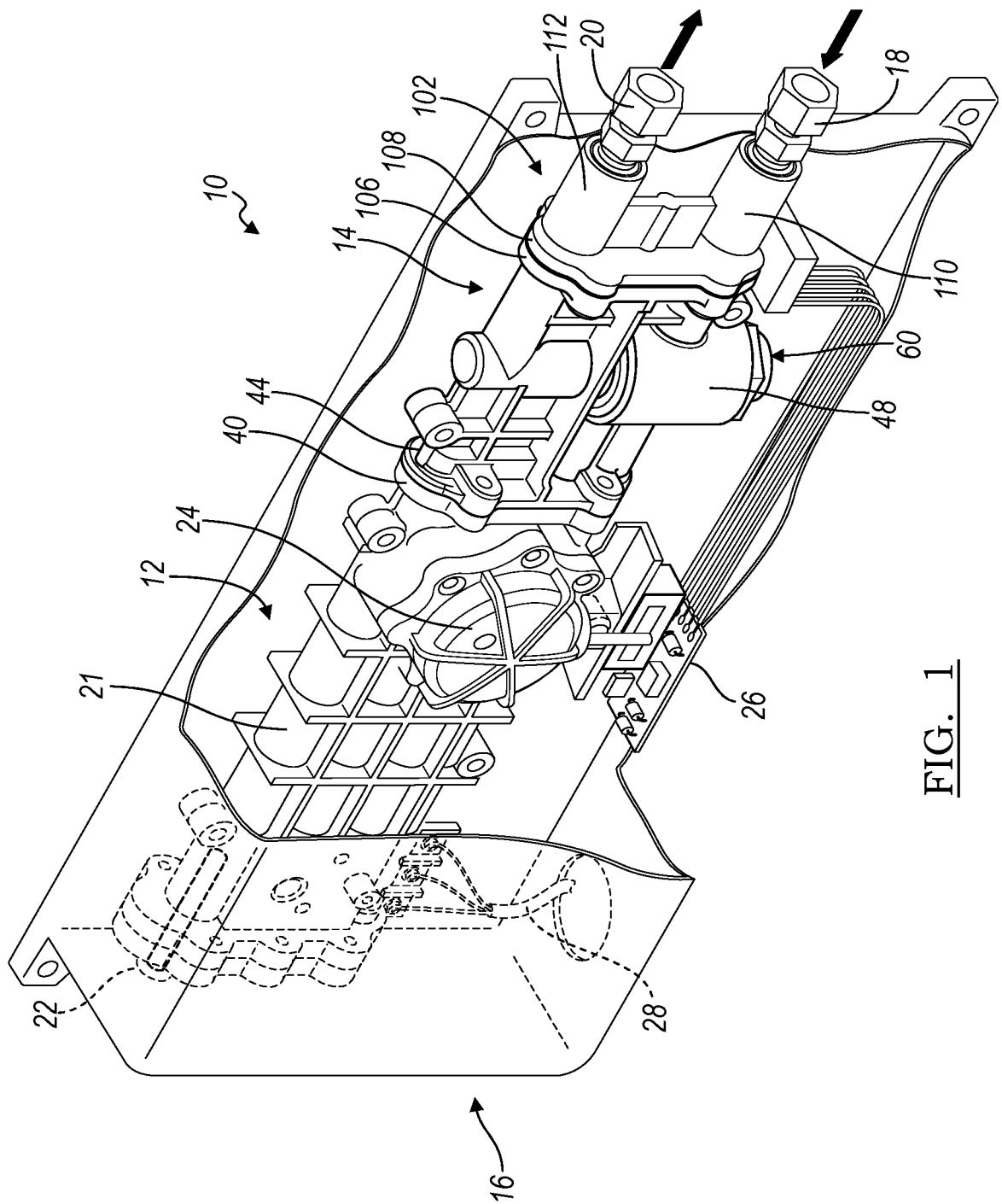
FIG. 1 is a perspective view, with portions broken away, of an electric tankless water heating system incorporating the principles of the present invention.
Figure 2:
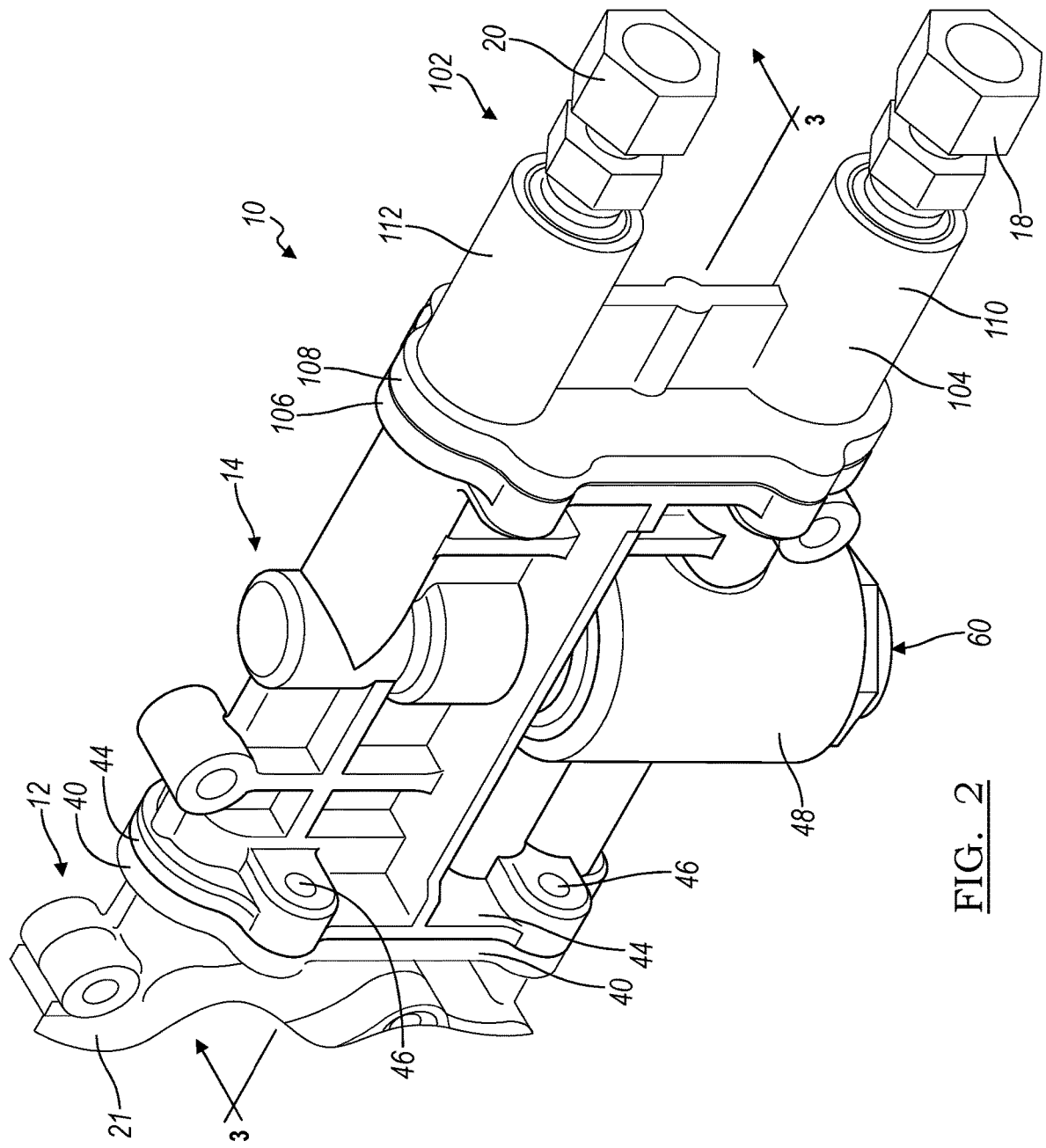
FIG. 2 is an enlarged perspective view of a portion of the electric tankless water heating system seen in FIG. 1.

Referring now to the drawings, an electric tankless water heating (TWH) system embodying the principles of the present disclosure is generally illustrated in FIG. 1 and designated at 10. In this regard, while the TWH system 10 is described herein as being a heater for a supply of water, it will be appreciated that a TWH system 10 within the scope of the present disclosure may be used for heating a continuous or intermittent supply of fluids other than water.

As seen in FIG. 1, TWH system 10 includes as its principal components a tankless water heater assembly 12, a mixing valve assembly 14 and a system housing 16. The system housing 16 encloses both the heater assembly 12 and the valve assembly 14 with only a cold water coupling 18 and a mixed water coupling 20 extending from the system housing 16. The cold water coupling 18 is configured to be connected to a cold water supply (not shown) and to receive cold water therefrom. The mixed water coupling 20 is configured to be connected to a fixture or device (not shown) where heated and tempered water is to be provided. Illustratively and without being limited thereby, such a fixture/device(s) may be a showerhead, a lavatory faucet or other fixture/device(s) requiring heated water. With a TWH system 10 according to the principles of the present invention, water at a set and substantially constant temperature is provided to the fixture/device.

Figure 3:
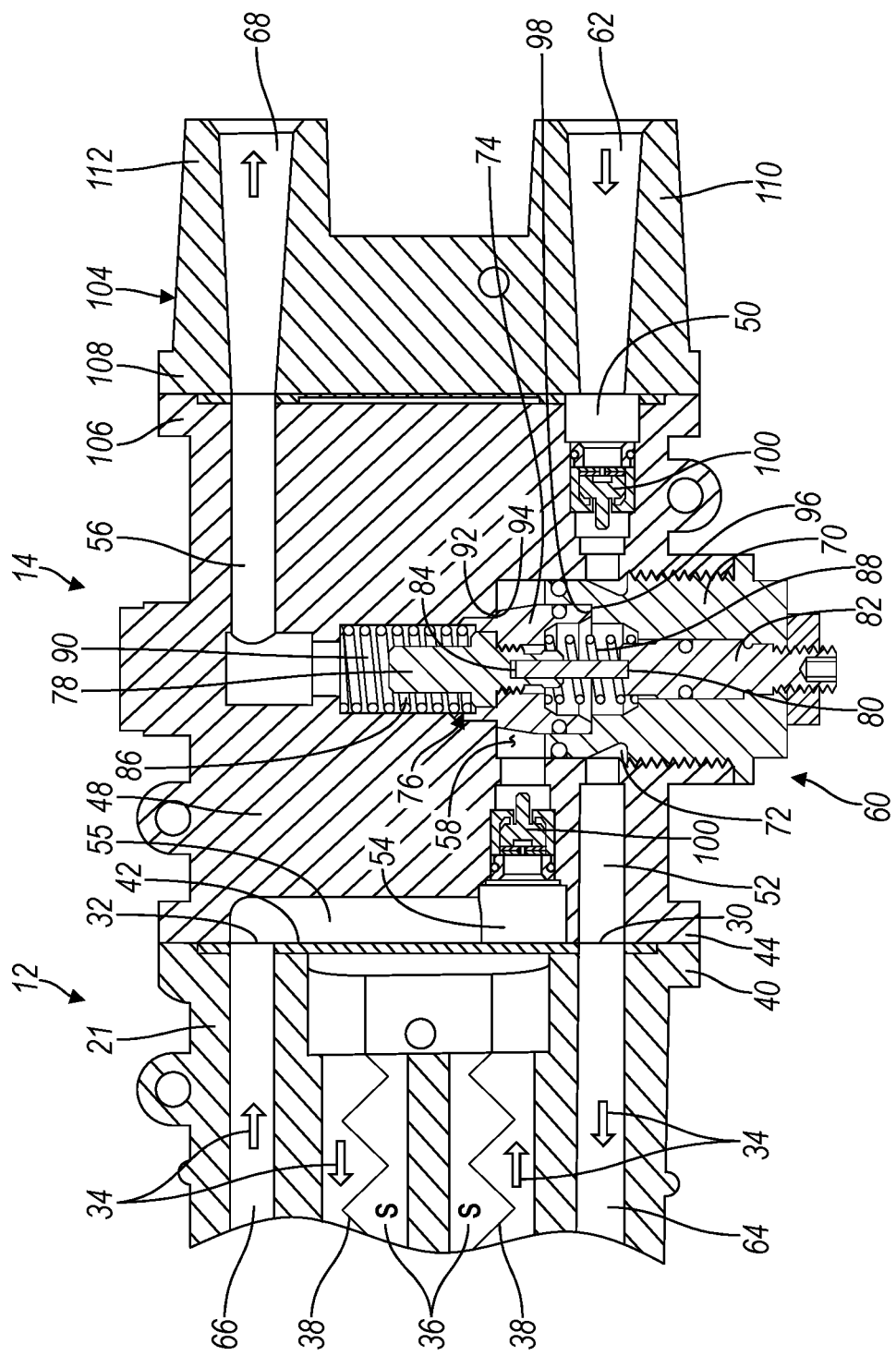
FIG. 3 is a cross sectional view, generally taken along line 3-3 in FIG. 2, of a portion of the electric tankless water heating system seen therein.

Referring now to FIG. 1, the tankless water heater assembly 12, hereafter just "heater assembly 12," includes heater housing 21, a temperature sensor 22, a flow sensor 24, a controller 26, and a power system 28. The heater housing 21 further includes or defines, as seen in FIG. 3, a cold water inlet 30 fluidly connected to a hot water outlet 32 by a water flow path 34, which includes a heating chamber 36. Located within the heating chamber 36 is one or more heating elements 38 that may be collectively or individually operated. Preferably and as generally illustrated, the flow path 34 follows a serpentine shape with the heating chamber 36 located centrally in the flow path 34. While illustrated as having a serpentine shape, the flow path 34 and heating chamber 36 may have alternate configurations depending on the particular application, as well as the overall size and shape of the heater assembly 12.

The heating element 38 is preferably formed of a resistive, electrically conductive, heating material, for example, molybdenum, tungsten, tantalum, niobium, nickel, chromium and alloys thereof, through which electricity may flow and resistively heat the water as it passes through the heating chamber 36 along the flow path 34 of the heater assembly 12. It is also possible for the heating element 38 to be sheathless. As used herein, a sheathless heating element is one where the underling resistive material does not include a ceramic coating covered by a stainless steel sheath, or additional coating or cover material. Rather, the resistive heating material of the heating element 38 is directly in contact with the water flowing through the heating chamber 36.

During operation of the heater assembly 12, the temperature sensor 22 measures the temperature of the water flowing through the heating chamber 36 and communicates this temperature to the controller 26. In this regard, the temperature sensor 22 is preferably located downstream of the heating element 38 or proximate the hot water outlet 32 so as to measure the temperature of the fluid as it is about to exit the heater assembly 12. The flow sensor 24 measures the flow condition of the fluid along the flowpath 34 and is also in communication with the controller 26. As used herein, the flow condition is the flow rate (e.g., gallons per minute) of the fluid flowing along the flowpath 34, but may optionally include other parameters of the fluid flow. The controller 26 is coupled to, or otherwise in communication with, the heating elements 38, the temperature sensor 22, and the flow sensor 24. In this regard, the controller 26 uses signals received from the temperature sensor 22 and/or the flow sensor 24 to control the operation of the tankless water heater 10. For example, during operation of the TWH system 10, and in response to signals received from the temperature sensor 22 and/or the flow sensor 24, the controller 26 may regulate the amount of electrical current flowing through the heating elements 38 to achieve the desired temperature at the hot water outlet 32. Further detailed operation of a tankless water heater assembly is disclosed in U.S. patent application Ser. No. 15/377,185, the entire contents of which are herein incorporated by reference.

The end of the water heater 12 in with the cold water inlet 30 and hot water outlet 32 are provided defines a flat mounting flange 40, which may be provided with a recess for receiving one or more gaskets 42 extending around both of the cold water inlet 30 and hot water outlet 32. The mounting flange 40 enables directly mounting of the mixing valve assembly 14 to the heater assembly 12. In this regard, the mixing valve assembly 14 includes a mounting flange 44 corresponding to the mounting flange 40 of the heater assembly 12. Appropriate fasteners 46, such as threaded fasteners, maybe utilized to secure the mounting flanges 40, 44 to one another in a fluid tight engagement.

The mixing valve assembly 14 includes a one-piece, unitary valve housing 48 formed from a suitable material, such as reinforced acetal copolymer, in a molding process, such as injection molding. Formed in the valve housing 48 are a cold water inlet passageway 50, a cold water outlet passageway 52, a hot water inlet passageway 54 and a mixed water outlet passageway 56. Connecting each of these passageways, the housing is also provided with centrally located a valve chamber 58 in which a mixing valve cartridge 60 is received.

As seen in FIG. 3, the cold water inlet and outlet passageways 50, 52 are diametrically opposed from one another and respectively form mating passageways with the internal passageways 62, 64 of the cold water coupling 18 and the cold water inlet 30. The hot water inlet passageway 54 and the mixed water outlet passageway 56 also form mating passageways, respectively with the passageway 66 of the hot water outlet 32 and passageway 68 leading to the mixed water coupling 20. The hot water inlet passageway 54 is partly formed by a transverse channel 55 defined in and extending along the end face of the mounting flange 44. The channel 55 operates to redirect water from the hot water outlet 32 toward the cold water inlet 30 so that the hot and cold water are provided at the valve chamber 58 in close proximity to one another. As will be appreciated from the following discussion, this allows for an efficient manufacturing and compact construction of the valve housing 48 and other components.

As previously mentioned, the mixing valve cartridge 60 is received in the valve chamber 58. The mixing valve cartridge 60 operates to deliver cold water to the cold water outlet passageway 52 and the cold water inlet 30 and to regulate the temperature of the mixed water exiting the mixing valve assembly 14 via the mixed water outlet passageway 56 and provided to the mixed water coupling 20.

To achieve the first of the above functions, the mixing valve cartridge 60 includes a bonnet 70 that is threadably received in a portion of the valve chamber 58. A circumferential portion of the bonnet 70 is relieved at a location corresponding with the cold water inlet and outlet passageways 50, 52 forming an annulus 72 about the bonnet and connecting the two passageways. As a result, cold water is permitted to pass around the bonnet 70 from the cold water inlet passageway 50 to the cold water outlet passageway 52 and on to the heater assembly 12.

To achieve the second function mentioned above, the mixing valve cartridge 60 includes a shuttle 74 fixed to a thermostatic motor 76. As seen in FIG. 3, a body 78 of the thermostatic motor 76 is threadably engaged with the shuttle 74 and a stem 80 of the motor 76 extends through the shuttle 74 and engages a temperature adjustment stem 82 of the mixing valve cartridge 60. The stem 80 is moveable relative to the body 78 and a wax material 84 is located adjacent an end of the stem 80 within the body 78. Based on the temperature of the water in a mixing chamber 86 defined within the shuttle 74 and about the motor 76, the wax material 84 either expands or contracts, axially moving the body 78 of the motor 76 and the shuttle 74. Opposing springs 88, 90 cooperate to bias the motor 76 and the shuttle 74 such that reciprocal axial movement readily occurs with the expansion and contraction of the wax material 84.

To provide hot water into the mixing chamber 86, a portion of the shuttle 74 defines a hot water lip 92 opposite of a hot water shoulder 94 defined by a portion of the valve housing 48 defining the mixing chamber 58. Depending on the position of the shuttle 74, a variably sized gap between the hot water lip 92 and shoulder 94 emits water through ports in the shuttle 74 and into the mixing chamber 86. The shuttle 74 also includes a cold water lip 96 opposed to a cold water shoulder 98 defined within the bonnet 70. Also depending on the position of the shuttle 74, a variably sized gap between the cold water lip 96 and shoulder 98 emits cold water through ports in the bonnet 70 and into the mixing chamber 86. The relative sizes of the gaps thus determines the degree to which the hot water is tempered by the cold water in the mixing chamber 86. The mixed water then flows past the body 78 of the motor 76, through the mixed water outlet passageway 56 an on to the mixed water coupling 20.

To ensure that backflow does not occur through the mixing valve assembly 14, check valves 100 are provided in the cold and hot water inlet passageways 50, 54.

The cold and hot water couplings 18, 20 may be part of a coupling leakage current collector assembly 102 that includes a coupling housing 104 connected to the mixing valve assembly 14. The coupling housing 104 may similarly be a one-piece, unitary housing 104 formed by casting or machining from a suitable material, such as chrome plated aluminum or stainless steel. The mixing valve housing 48 and coupling housing 104 respectively include mounting flanges 106, 108 to facilitate connecting of the two components together, also preferably by fasteners. As seen in FIG. 3, passageways 62 and 68 are defined in the coupling housing 104 within ports 110, 112.

As a person skilled in the art will really appreciate, the above description is meant as an illustration of at least one implementation of the principles of the present invention. This description is not intended to limit the scope or application of this invention since the invention is susceptible to modification, variation and change without departing from the spirit of this invention, as defined in the following claims.

I claim:

1. A tankless water heating system comprising:
   a tankless water heater assembly including a heater housing having a cold water inlet, a hot water outlet and a heating chamber therebetween, at least one heating element located in the heating chamber, and a controller coupled to the heating element and a temperature sensor located in a flow through the heater housing, the controller configured to regulate an amount of electrical current flowing through the heating element in response to a flow condition measured by the flow sensor;
   a mixing valve assembly including a one piece mixing valve housing mounted directly to the heater housing, the mixing valve housing defining an unheated water path proceeding from a cold water inlet passageway to a cold water outlet passageway, the cold water outlet passageway being directly coupled to the cold water inlet of the heater housing, the mixing valve housing also defining a heated water path proceeding from a hot water inlet passageway to a mixed water passageway, the hot water inlet passageway being directly coupled to the hot water outlet of the heater housing, a flow of water through the mixed water passageway being controlled by mixing valve, the mixing valve including a shuttle operably coupled to a thermostatic motor located in a valve chamber defined in the mixing valve housing, the valve chamber being in fluid communication with the cold water inlet passageway, the cold water outlet passageway, the hot water inlet passageway and the mixed water outlet passageway, the shuttle being axially moveable by the thermostatic motor to selectively open and close a cold water port and a hot water port into a mixing chamber defining at least in part by the shuttle and in which at least part of the thermostatic motor is provided, the mixing chamber being fluidly coupled to the mixed water outlet passageway; and
an assembly housing enclosing both the heater assembly and the mixing valve assembly.

2. A tankless water heating system comprising:
a tankless water heater assembly including a heater housing having a cold water inlet, a hot water outlet and a heating chamber there between, at least one heating element located in the heating chamber, and a controller coupled to the heating element and a temperature sensor located in a flow through the heater housing, the controller configured to regulate an amount of electrical current flowing through the heating element in response to a flow condition measured by the flow sensor;
a mixing valve assembly including a one piece mixing valve housing mounted directly to the heater housing, the mixing valve housing defining an unheated water path proceeding from a cold water inlet passageway to a cold water outlet passageway, the cold water outlet passageway being directly coupled to the cold water inlet of the heater housing, the mixing valve housing also defining a heated water path proceeding from a hot water inlet passageway to a mixed water passageway, the hot water inlet passageway being directly coupled to the hot water outlet of the heater housing, a flow of water through the mixed water passageway being controlled by mixing valve, the mixing valve including a shuttle operably coupled to a thermostatic motor located in a valve chamber defined in the mixing valve housing, the valve chamber being in fluid communication with the cold water inlet passageway, the cold water outlet passageway, the hot water inlet passageway and the mixed water outlet passageway, the shuttle being axially moveable by the thermostatic motor to selectively open and close a cold water port and a hot water port into a mixing chamber defining at least in part by the shuttle and in which at least part of the thermostatic motor is provided, the mixing chamber being fluidly coupled to the mixed water outlet passageway;
the heater housing and the mixing valve housing including mounting flanges in mating engagement with one another; and
an assembly housing enclosing both the heater assembly and the mixing valve assembly.

3. The tankless water heater system of claim 2, wherein the mounting flanges are secured together by at least one fastener.

4. The tankless water heater system of claim 2, wherein cold water passageway terminates at or adjacent to the mounting flange of the mixing valve housing.

5. The tankless water heater system of claim 2, the hot water passageway originates at or adjacent to the mounting flange of the mixing valve housing.

6. The tankless water heater system of claim 2, wherein the mounting flange of the mixing valve housing defines a channel coupled to the hot water passageway.

7. The tankless water heater system of claim 6, wherein the channel forms a terminal portion of the hot water passageway.

8. The tankless water heater system of claim 6, wherein the channel is transverse to the hot water passageway.

9. The tankless water heater system of claim 6, wherein the channel extends along the mounting face.

10. The tankless water heater system of claim 6, wherein the channel is open in the direction of the heater housing.

11. The tankless water heater system of claim 1, wherein the unheated water path flows around the mixing valve.

12. The tankless water heater system of claim 1, wherein the unheated water path is partially defined by the mixing valve.

13. The tankless water heater system of claim 12, wherein the unheated water path is partially defined by an annulus formed in a portion the mixing valve.

14. A mixing valve assembly comprising a one piece mixing valve housing, the housing defining an unheated water path proceeding from a cold water inlet passageway to a cold water outlet passageway, the housing also defining a heated water path proceeding from a hot water inlet passageway to a mixed water outlet passageway, a flow of water through the mixed water passageway being controlled by mixing valve, the mixing valve including a shuttle operably coupled to a thermostatic motor located in a valve chamber defined in the mixing valve housing, the valve chamber being in fluid communication with the cold water inlet passageway, the cold water outlet passageway, the hot water inlet passageway and the mixed water outlet passageway, the shuttle being axially moveable by the thermostatic motor to selectively open and close a cold water port and a hot water port into a mixing chamber defining at least in part by the shuttle and in which at least part of the thermostatic motor is provided, the mixing chamber being fluidly coupled to the mixed water outlet passageway.

15. A mixing valve assembly comprising a one piece mixing valve housing, the valve housing defining an unheated water path proceeding from a cold water inlet passageway to a cold water outlet passageway, the housing also defining a heated water path proceeding from a hot water inlet passageway to a mixed water outlet passageway, a flow of water through the mixed water passageway being controlled by mixing valve, the mixing valve including a shuttle operably coupled to a thermostatic motor located in a valve chamber defined in the mixing valve housing, the valve chamber being in fluid communication with the cold water inlet passageway, the cold water outlet passageway, the hot water inlet passageway and the mixed water outlet passageway, the shuttle being axially moveable by the thermostatic motor to selectively open and close a cold water port and a hot water port into a mixing chamber defining at least in part by the shuttle and in which at least part of the thermostatic motor is provided, the mixing chamber being fluidly coupled to the mixed water outlet passageway, the valve housing further including a mounting flange, and the cold water passageway terminating at or adjacent to the mounting flange.

16. The mixing valve assembly according to claim 15, wherein the hot water inlet passageway originates at or adjacent to the mounting flange.

17. The mixing valve assembly according to claim 15, wherein the mounting flange of the mixing valve housing defines a channel coupled to the hot water passageway.

18. The mixing valve assembly according to claim 16, wherein the channel is open on one side.

19. The mixing valve assembly according to claim 17, wherein the channel is transverse to the hot water inlet passageway.

20. The mixing valve assembly according to claim 14, wherein the unheated water path flows around the mixing valve.

21. The mixing valve assembly according to claim 14, wherein the unheated water path is partially defined by the mixing valve.

22. The mixing valve assembly according to claim 14, wherein the unheated water path is partially defined by an annulus formed in a portion the mixing valve.

\* \* \* \* \*